Figure 1:
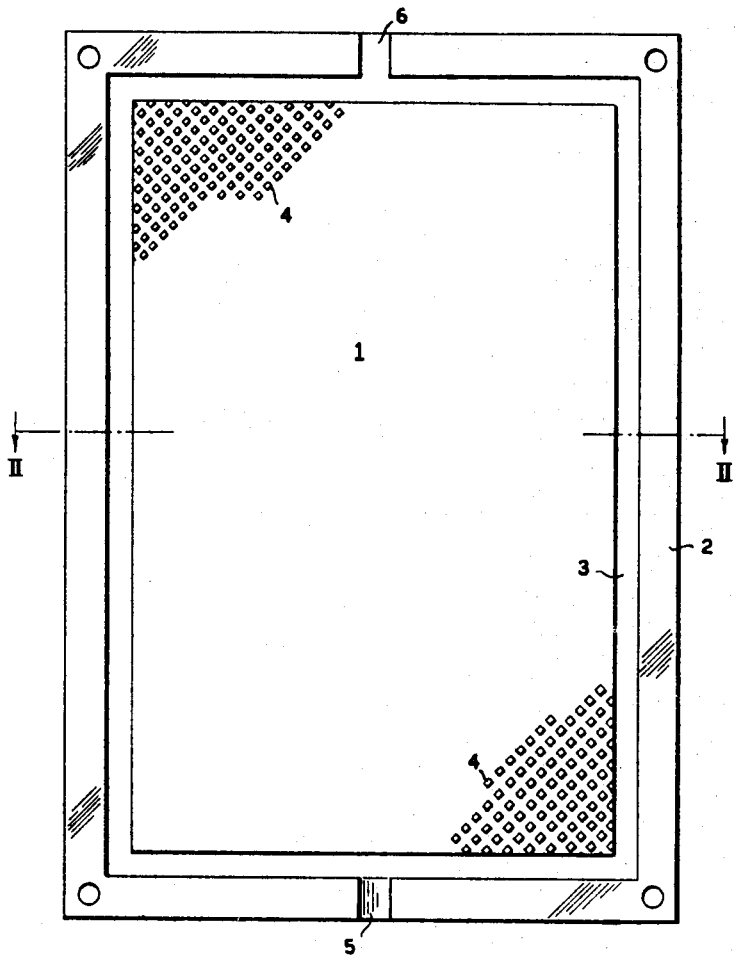

July 5, 1955   J. TER MARSCH   2,712,159
METHOD AND DEVICE FOR MANUFACTURING ARTICLES OF
LATEX RUBBER MATERIAL PROVIDE WITH OPENINGS
Filed Dec. 28, 1950   3 Sheets-Sheet 1

INVENTOR
JACOB TER MARSCH
BY A. John Michel
ATTORNEY

July 5, 1955  J. TER MARSCH  2,712,159
METHOD AND DEVICE FOR MANUFACTURING ARTICLES OF
LATEX RUBBER MATERIAL PROVIDE WITH OPENINGS
Filed Dec. 28, 1950  3 Sheets-Sheet 3

INVENTOR
JACOB TER MARSCH
BY
ATTORNEY

United States Patent Office 2,712,159
Patented July 5, 1955

2,712,159

METHOD AND DEVICE FOR MANUFACTURING ARTICLES OF LATEX RUBBER MATERIAL PROVIDED WITH OPENINGS

Jacob ter Marsch, The Hague, Netherlands

Application December 28, 1950, Serial No. 203,176

6 Claims. (Cl. 18—42)

Openings in a rubber sheet can be obtained by punching holes. The character of the material renders it impossible to obtain in this manner many small perforations at a small mutual distance.

For various objects it is desirable, however, to dispose of an elastic material, such as rubber, provided with a large number of small openings or perforations and having a great strength so that the thickness thereof need not to be chosen such that the extensibility decreases thereby in an inadmissible way.

For various kinds of garments such as e. g. corsets, step-ins, suspenders and the like a material is required which is elastic and strong and which is provided with a great number of small holes through which the skin gets sufficient opportunity to exhale and "breathe."

It is known to manufacture rubber sheets with openings of predetermined size by spreading out latex on a metal band with studs and drying, or by including air in the material which air on heating makes pores in the sheet by expansion.

The object of the present invention is to manufacture articles of latex rubber material such as sheets, plates or bands having a great number of openings and being both elastic and strong.

Another object of the present invention is to manufacture articles of latex rubber material some parts of which are provided with a great number of small holes or openings, whereas other parts, such as e. g. the edges have no openings, the entire material being both elastic and strong.

A still further object of the present invention is to manufacture articles of latex rubber material which besides parts provided with openings and, if desired, parts not provided with openings, such as e. g. edges, have also strengthened parts, the parts provided with openings as well as the parts not provided with openings and the strengthened parts being both elastic and strong.

Still another object of the present invention is to manufacture articles of latex rubber material which besides parts provided with and, if desired, parts not provided with openings and/or strengthened parts also have parts extending at the periphery.

According to the present invention articles of latex rubber material provided with openings are manufactured by bringing rubber latex material rendered heat sensitive into a mold consisting of two co-operating parts at least one of which at one side being provided with studs, the studs of the one part being in such an intimate contact with the surface of the opposite part of the mold that those parts of the surface remain free of rubber latex, whereas the space between the studs is completely filled by the rubber latex rendered heat sensitive, thereupon heating the rubber latex rendered heat sensitive in the mold to a sufficiently elevated temperature during a sufficient time to get the rubber latex to gelling and subsequently further treating the resulting gelled rubber sheet by drying and vulcanizing.

The invention comprises also a device, such as a mold, for the manufacture of an article of latex rubber material provided with openings comprising two co-operating parts, one of which at least is provided at one side with studs, the studs of the one part being in such an intimate contact with the surface of the opposite part of the mold that those parts of the surface remain free of rubber latex, whereas the space between the studs is completely accessible for the rubber latex rendered heat sensitive and at least one part of the mold being provided with an admission channel for the rubber latex at the one side and an air evacuation channel at the opposite side.

The mold may be provided with studs over the whole or over part of its surface and may have extending parts at the periphery for the manufacture of articles provided with openings over the whole or over part of their surfaces and provided with extending parts at their peripheries.

The mold may have any desired shape, and may be flat or bent, and may have a shape closed in itself, according to a flat or bent article, or an article closed in itself being desired.

By the expression "co-operating parts," plates, bands, drums or bags are indicated which are provided with studs. The studs may have any form or shape, they may be square, trilateral or circular or have any other cross section and the width and the depth of the space between the studs may have any dimension provided the condition is complied with that the spaces between the studs intersect and the studs are in such an intimate contact with the surface of the opposite part of the mold that those parts of the surface remain free of rubber latex, whereas the space between the studs is completely filled by the rubber latex rendered heat sensitive. The rubber article formed after gelling and vulcanizing contains openings at those spots where the studs touched the surface of the opposite part of the mold before and during the formation of the rubber sheet and thereby have prevented the formation of a compact rubber sheet at those spots, whereas the rubber latex during bringing of the rubber latex rendered heat sensitive into the mold flows freely through the space between the studs so that the latter before the start of the gelling process is completely filled with rubber latex.

By choosing the dimensions of the studs in a certain manner it is possible to manufacture an article complying with very determined demands.

According to the present invention it is possible to cast a rubber sheet or band provided with openings in one single operation which sheet or band, if desired, also has strengthened edges or other strengthened parts. Thus e. g. by casting rubber latex in a single operation into a suitable mold a garment provided with suspenders, such as a step-in can be manufactured. The dimension and shape of the openings can be varied within broad limits and the shape of the article to be manufactured can practically be chosen arbitrarily.

Figure 2:
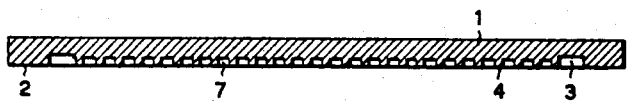
Figure 3:
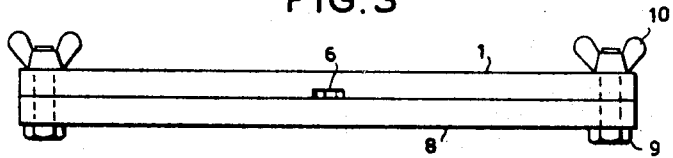
Figure 6:
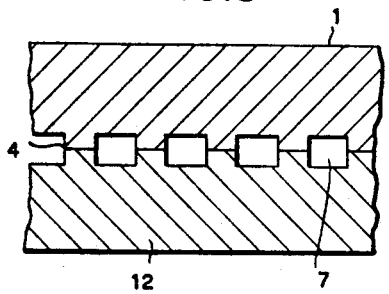
Figure 7:
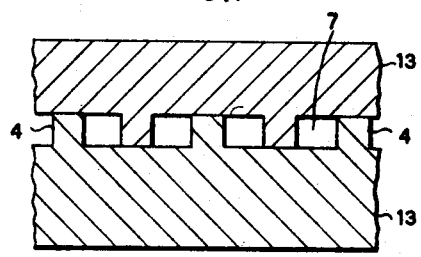
Figure 8:
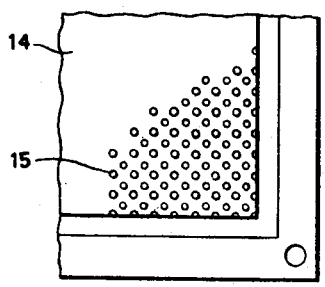
Figure 9:
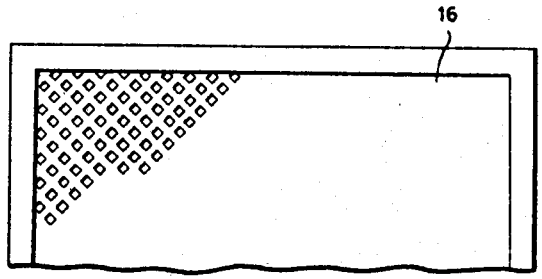

The invention is elucidated by way of example by the accompanying drawings, in which:

Figure 1 shows an elevation of one of the two co-operating parts of a mold which is carried out as a plate, Figure 2 shows a cross section along the line II—II of the part of the mold shown in Fig. 1, Figure 3 shows a side elevation of the mold after it having been closed, Figures 4, 5, 6 and 7 show details of a part of a mold according to the present invention, Figure 8 shows one of the two co-operating parts of a mold which is carried out as a plate, in which the studs have a circular form, Figure 9 shows a part of a latex rubber article partially provided with openings which has been manufactured according to the method of the invention.

Figure 10:
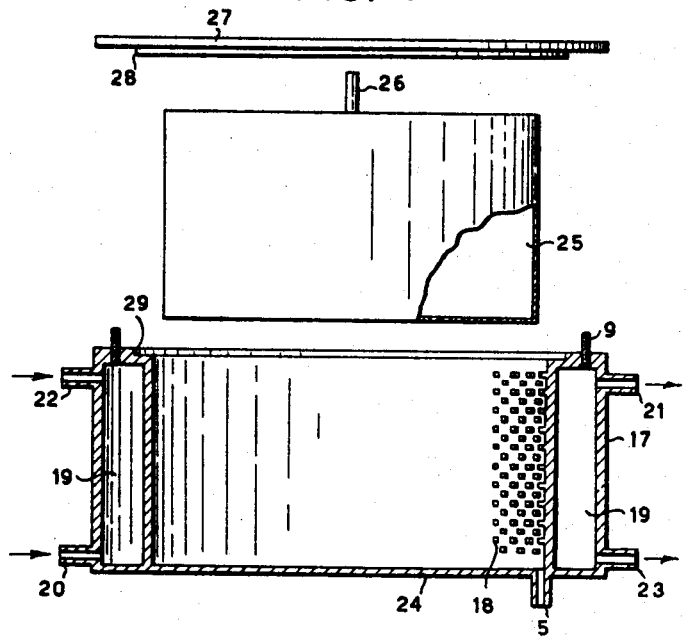
Figure 11:
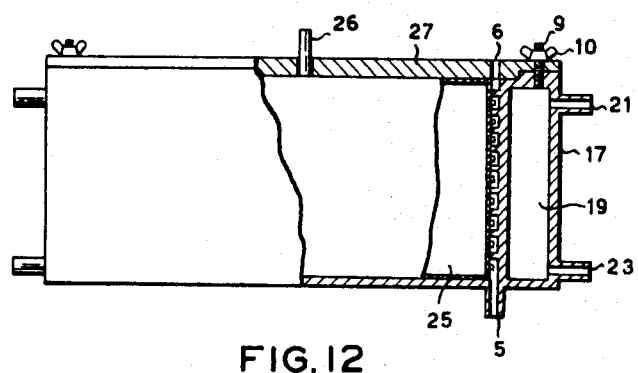
Figure 12:
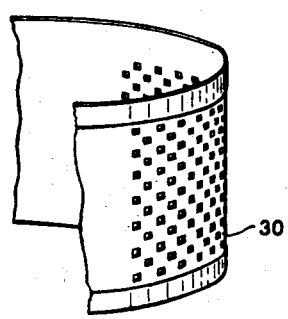

Figure 10 shows the three parts of a mold according to a preferred embodiment, viz. the cover, an air bag and the body of a mold, by means of which articles of a shape closed in itself may be manufactured, the air bag and the body forming the co-operating parts of the mold, Figure 11 shows the mold after it having been assembled and Figure 12 shows a latex rubber article provided with openings which has been manufactured by means of the mold shown in Figs. 10 and 11.

In Fig. 1 the shown part 1 of the mold is provided with an edge 2, whereas 3 shows a recess which after immersion of the mold in the latex is completely filled therewith. After gelling and vulcanization of the latex a part which contains no openings, such as an edge, is obtained in the recess. In the middle part are the intersecting studs 4 which have only partially been drawn and which are alternated by the space between them which is filled by the latex when this enters the mold through the admission channel 5, whereas the air at the same time is eliminated through the air evacuation channel 6.

Figure 5:
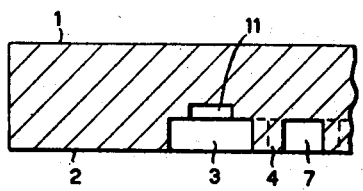

If desired, a still deeper recess can be formed, for example in the part 3, due to which in the completed article, after filling of the mold with latex, gelling and vulcanization, a strengthening edge of larger thickness than that of the rest of the article is formed. Such a recess 11 is shown in Fig. 5.

In Fig. 2 which shows a cross section along the line II—II in the part 1 of the mold represented in Fig. 1, the body of the part 1 of the mold is visible as well as the edge 2. The recess 3 forms that part of the mold which after filling with the latex mixture, gelling and further treatment gives rise to an edge of a somewhat greater thickness than the rest of the rubber article provided with openings. Although such an edge of greater thickness may be desirable for strengthening the rubber article, particularly when manufacturing rubber articles of very small thickness provided with openings, it may have any thickness and preferably the same thickness as the part of the said article or it may be somewhat thicker.

The studs 4 form those parts of the mold which come in such an intimate contact with the surface of the other co-operating parts of the mold, not represented in this figure, that those parts of the surface remain free of rubber latex, whereas the spaces 7 between the studs 4 as well as the recess 3 are completely accessible therefor, when the closed mold is filled with the rubber latex rendered heat sensitive.

Fig. 3 represents the mold in closed condition, the upper part representing the part 1 indicated in Figs. 1 and 2 in which the air evacuation channel 6 is visible. The parts 1 and 8 of the mold are clamped against each other by means of bolts 9 and butterfly nuts 10. Any other clamping device, however, may be used provided that the co-operating parts of the mold are clamped against each other in such a manner that the studs of one part are in such intimate contact with the surface of the opposite part of the mold that those parts of the surface remain free of rubber latex.

Figure 4:
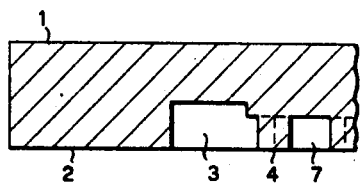

Figs. 4, 5, 6 and 7 give details of embodiments according to the invention, Fig. 4 being an enlargement of a detail of part 1 of Fig. 2, and Fig. 5 being an embodiment of the invention in which the recess 3 locally has a further recess 11, by which a part of the rubber article is provided with an extra-strengthened edge. Fig. 6 represents part of a preferred embodiment of the mold in which both co-operating parts 1 and 12 of the mold contain studs which mutually completely correspond in shape as well as in dimension and are arranged on corresponding opposite parts of the co-operating parts 1 and 12 of the mold so that after closing of the mold the formation of a compact rubber sheet is prevented by the contacting studs which touch each other instead of contacting the surface of the opposite part of the mold.

Fig. 7 represents a special embodiment in which not one but both co-operating parts 13 of the mold are provided with studs 4, the studs alternately forming part of the two co-operating parts 13 of the mold.

Fig. 8 represents a section of one part of a flat mold 14 with circular studs 15.

Fig. 9 represents a latex rubber article 16 after gelling, resp. after further treatment by drying and vulcanizing which rubber article has been manufactured according to the invention. It does not make any difference and it is not visible later on either whether the article has been manufactured in a device with the studs in one part of the mold, such as e. g., in Figs. 4 and 5 or with the studs in both co-operating parts of the mold, such as in Figs. 6 and 7.

Fig. 10 shows a mold comprising three parts by means of which a latex rubber article with a shape closed in itself may be manufactured. One part 17 of the mold has an inner surface with a shape closed in itself, such as a cylinder surface, which is provided with studs 18. This part of the mold consists preferably of rigid material and is enclosed by a jacket 19 which may be heated or cooled as desired. In this jacket a heating medium, such as for instance hot water of a suitable temperature may be circulated, but also a cooling medium may be circulated in it. Therefore an inlet 20 and an outlet 21 for the heating medium and an inlet 22 and an outlet 23 for the cooling medium are provided. The part 17 of the mold contains a bottom 24, in which an admission channel 5 for supplying the rubber latex mixture rendered heat sensitive is provided in the immediate vicinity of the inner surface. The second part 25 of the mold co-operating with the first mentioned part 17 consists of an air bag which is provided with an air inlet 26 which may be performed e. g. as a valve, and the third part 27 of the mold is a cover which may be attached by means of bolts 9 with butterfly nuts 10 (see Fig. 11). The cover is provided with an air evacuation channel 6 and with a rim 28 for properly adjusting the position of the cover with regard to the first part of the mold, which is provided with a shoulder 29 of suitable inner diameter to receive the rim 28 of the cover.

Fig. 11 shows the mold of Fig. 10 in assembled form and Fig. 12 shows an example of an article 30 manufactured by means of the mold shown in Fig. 10.

The material of which the plates used for the mold consist may be any material which is resistant to the increase of temperature which is applied when performing the method, and to the action of the substances present in the rubber latex mixture, including the gelling agent, vulcanizing agents, anti-oxidants and other materials, if any, present in the latex. The co-operating parts of the mold may consist of any suitable corrosion resistant metal which is insensitive to the substances present in the rubber latex. According to a preferred embodiment one of both co-operating parts is provided with a flat surface which is coated with a layer of elastic material which is unattachable to the rubber latex mixture, as e. g. rubber or polyvinyl chloride by which a good sealing of the co-operating parts lying against each other is obtained. Also the entire mold can be made of rubber or polyvinyl chloride. Besides rubber or polyvinyl chloride any elastic material which is resistant during the treatment of the rubber latex mixture can be used as coating material or as the material from which the mold is made. Also the separate parts of the mold may consist of different materials, as is the case for instance with the mold of Fig. 10.

The invention is not limited thereto that the studs are in one of the parts, whereas the other part has a flat inner surface, but both co-operating parts can be provided with alternate studs in such a manner that after closing of the mold by putting the inner surface of the parts against each other a space is obtained in the mold which space is filled with the rubber latex mixture when it enters the mold, whereas those parts of the surfaces which are formed by the studs are in such an intimate contact with the opposite surface of the mold that the formation of a rubber sheet at those spots is prevented.

According to a preferred embodiment of the invention both co-operating parts of the mold are provided with mutually corresponding studs of the same shape and dimension so that the elevations or studs of the one part one by one come into contact with the elevations of the other part of the mold so that the formation of a compact rubber sheet between the elevations is prevented.

For the manufacture of an article which over its entire surface is provided with openings a mold has to be used the studs or elevations of which are not interrupted or alternated by parts where the surface of the plate has no studs. If it is desired to provide the rubber article with parts having no openings, such as edges, the mold at that spot has to be provided with an uninterrupted channel or recess which is completely filled by the rubber latex mixture of which the article to be formed is to be manufactured. The rubber sheet which during the gelling is formed in the mold at that spot is free of openings. It is also possible to arrange thickenings in the article to be manufactured, such as for instance strengthening edges by providing the surface of the parts of the mold with recesses having a greater depth in those parts where the strengthening edges have to be made than in the other parts.

The mold is provided with an admission channel 5 through which the rubber latex mixture can flow into the mold and with an air evacuation channel 6 arranged opposite thereto through which the air can escape from the mold during the flowing in of the rubber latex mixture between the studs of the mold. Before the rubber latex mixture being brought into the mold, the mold is closed by putting the plates against each other and by clamping them against each other with a clamping device of known construction, or by means of air pressure as in Fig. 10.

The admission channel 5 may have a cross section of any form provided it is adapted to be connected with a supplying means, such as, for instance, a tube for supplying the rubber latex rendered heat sensitive.

The filling of the mold can be carried out by slowly admitting the rubber latex rendered heat sensitive from below into the mold through the admission channel, the latex flowing upwards through the admission channel into the mold whereas the air by the latex, slowly mounting in the mold is driven from the space between the studs and the recesses of the mold and leaves the mold by the air evacuation channel at the top of the mold. By operating in this manner the air is driven by the latex from the entire space between the studs and from the recesses in the mold so that the sheet or article obtained after gelling of the latex has openings or perforations only there where the flowing in of the latex has been prevented by the studs of the mold.

The filling of the mold with latex also can take place in any other method, either with the application of pressure or not, provided that the filling takes place in such a manner that the space between the studs and the recesses is completely filled with the latex mixture, without air remaining in the mold.

It is not possible, however, to manufacture a perforated article of rubber material according to the invention by putting the parts of the mold separately into the latex liquid and by subsequent elimination of the latex from the spaces between the studs and the opposite surface by closing the mold and by subsequent further treatment of the latex. If one operates in this manner one does not succeed in obtaining an article which is provided with openings, but a sheet not interrupted by openings is obtained, missing one of the most important advantages of the articles manufactured according to the process of the present invention. For, whereas the thin films, which, notwithstanding the presence of the studs on the parts of the mold, are formed because the rubber latex which is present before closing of the parts of the mold between the studs on the one part and the opposite surface of the mold is not pressed away when closing the mold and consequently after gelling of the latex gives rise to an uninterrupted sheet, are of no or practically no importance for the mechanical strength of the resulting sheet, the important advantage that exhalation or breathing can take place through the openings of the sheet is lost.

The rubber latex mixture which is used as the starting material for the carrying out of the process according to the invention can be any natural latex or synthetic latex to which the substances necessary for gelling and vulcanization and, if desired, still other materials such as e. g. fillers and softeners, have been added.

After the mold having been filled with the latex mixture rendered heat sensitive, the mold is heated in a suitable manner to such a temperature and during such a time that gelling of the rubber latex occurs. A heating period of approximately 10 minutes at a temperature of approximately 75° C. is sufficient.

After the gelling has been completed a rubber sheet has been formed with predetermined openings which is treated further, e. g. by drying and vulcanizing.

Since the latex mixed with the gelling and vulcanizing agents is a low viscous liquid it is possible to press it through very fine channels by which a very thin rubber sheet with many very small openings can be obtained. As the molecules of the rubber particles are not damaged by punching such a latex rubber sheet provided with openings has a much greater strength than a latex rubber sheet of equal thickness with punched holes or perforations, which is one of the principal advantages of the method according to the invention.

The invention is elucidated by the following embodiments. Parts are parts by weight.

Example I

A rubber latex mixture of the following composition is prepared:

167 g. of a natural rubber latex with a dry rubber content of 60% are mixed with 12 g. of a 50% aqueous dispersion the dispersed components of which consist of:

| | Grams |
|---|---|
| Sulphur | 1.5 |
| Zinc oxide | 2 |
| Butylzymate | 1 |
| Age-rite alba | 1 |

The zinc oxide acts as an activator, while the butylzymate (zinc dibutyl dithiocarbamate) acts as an accelerator and the age-rite alba (hydroquinone monobenzyl ether) as an anti-oxidant. The two last mentioned substances are products of R. T. Vanderbilt, New York.

Finally 10 g. of a 20% aqueous ammonium chloride solution (Kaysam process) are added to the dispersion as a gelling agent.

This mixture is brought into a container, whereupon the closed mold with the admission channel at the bottom is slowly immersed in the latex mixture rendered heat sensitive, the air slowly evacuating through the air evacuation channel at the top. The mold completely filled with latex is heated during approximately 10 min. at a temperature of 75° C., whereupon the mold is opened and the gelled article is taken from the mold to be further treated. This treatment consists of washing out, drying and vulcanizing.

Example II

A rubber latex mixture of the following composition is prepared. (I. F. C., Paris) 1 g. trypsin powder (pancreas powder) is soaked in 10 g. water and this mixture is added to 1 kg. latex 60%. After 48 hours' aging of this mixture 72 g. of the 50% dispersion of vulcanization ingredients as described in Example I plus 12 g. of a 50% aqueous zinc oxide dispersion are added. The latex mixture is now heat sensitive and can be treated in the same manner as in Example I with the exception of the washing out which may be omitted. The dispersions may be made in a ball mill.

Example III

The air bag is inserted into the mantle and the cover is put up. The air bag is blown up so that the studs provided either on the air bag or on the inner surface of the mantle or on both are pressed against the opposite wall and coherent channels or spaces are formed which may be filled with latex through the admission channel. The mantle is subsequently heated, the latex gels. The mantle is cooled down and the air bag is emptied, the gel is taken out. The gel is treated further in the usual manner, viz. by washing, drying and vulcanizing.

In this manner a seamless round article, such as a step-in is manufactured, which is cast in one step.

What is claimed is:

1. Method for the manufacture of a thin perforated rubber article, comprising the steps of tightly closing a two-part mold, at least one part of which is provided with studs over at least part of its surface, flexing one part of the mold in conformity with the surface of the other part to assure intimate contact between the studs and the other part of the mold, introducing heat-sensitized latex into the closed mold, and gelling the latex in the closed mold.

2. Method for the manufacture of a thin perforated rubber article, comprising the steps of tightly closing a two-part mold, at least one part of which is provided with studs over at least part of its surface, applying fluid pressure to one part of said mold sufficient to flex said part in conformity with the surface of the other part to assure intimate contact between the studs and the other part of the mold, introducing heat-sensitized latex into the closed mold, and gelling the latex in the closed mold.

3. Molding apparatus for the manufacture of a thin perforated rubber article, comprising a substantially cylindrical inner mold section, a cooperating substantially cylindrical outer mold section, studs provided on at least one of said mold sections, said studs being sufficiently long to make intimate contact with the other mold section upon closure of the two sections, and the closed mold sections forming a cavity therebetween and between the studs making intimate contact with the opposite mold section, means for introducing rubber latex into said cavity and means for evacuating air therefrom.

4. Molding apparatus as defined in claim 3, wherein one of said mold sections is flexible.

5. Molding apparatus as defined in claim 4, wherein fluid prssure means is provided for flexing said flexible mold section.

6. Molding apparatus for the manufacture of a thin perforated rubber article, comprising a substantially cylindrical inner mold section of flexible material, studs on said inner mold section, a cooperating substantially cylindrical outer mold section, fluid pressure means for flexing said inner mold section in conformity with the contour of the outer mold section and so that the studs on the inner mold section make intimate contact with the outer mold section, said mold sections forming a cavity therebetween and between the studs making intimate contact with the outer mold section, means for introducing rubber latex into said cavity and means for evacuating air therefrom.

References Cited in the file of this patent

UNITED STATES PATENTS

| | | |
|---|---|---|
| 753,959 | Crump | Mar. 8, 1904 |
| 1,587,577 | Beitel | June 8, 1926 |
| 2,032,923 | Eldridge | Mar. 3, 1936 |
| 2,294,966 | Dreyfus | Sept. 8, 1942 |
| 2,358,962 | Cunningham | Sept. 26, 1944 |
| 2,364,036 | MacKay | Nov. 28, 1944 |
| 2,441,699 | Gramelspacher | May 18, 1948 |
| 2,460,831 | Kovacs | Feb. 8, 1949 |
| 2,510,841 | Stowe | June 6, 1950 |
| 2,574,391 | Herrly | Nov. 6, 1951 |